(12) United States Patent
Schrader

(10) Patent No.: US 6,494,345 B2
(45) Date of Patent: Dec. 17, 2002

(54) FOOD DECORATING SYSTEM

(76) Inventor: Robert J. Schrader, 1322 Harvard Dr., Rochester Hills, MI (US) 48307

( * ) Notice: Subject to any disclaimer, the term of this patent is extended or adjusted under 35 U.S.C. 154(b) by 0 days.

(21) Appl. No.: 09/826,192

(22) Filed: Apr. 4, 2001

(65) Prior Publication Data

US 2002/0145011 A1 Oct. 10, 2002

(51) Int. Cl.[7] ................................................. B67D 5/06
(52) U.S. Cl. ........................ 222/179; 222/326; 222/389; 251/295
(58) Field of Search ................................. 222/179, 182, 222/326, 389, 386, 394; 251/295

(56) References Cited

U.S. PATENT DOCUMENTS

| 160,936 | A | | 3/1875 | Meyer |
|---|---|---|---|---|
| 1,465,620 | A | | 8/1923 | Anderson |
| 2,615,598 | A | | 10/1952 | Watkins et al. |
| 2,709,524 | A | | 5/1955 | Eller et al. |
| 3,124,276 | A | | 3/1964 | Grout |
| 3,272,393 | A | | 9/1966 | Roeser |
| 3,581,957 | A | | 6/1971 | McCray |
| 3,594,828 | A | * | 7/1971 | Seek ........................... 222/179 |
| 4,041,995 | A | | 8/1977 | Columbus |
| 4,147,278 | A | | 4/1979 | Uhlig |
| 4,231,494 | A | * | 11/1980 | Greenwood ............... 184/105.2 |
| 4,489,857 | A | | 12/1984 | Batlas |
| 4,932,094 | A | | 6/1990 | McCowin |
| 5,044,471 | A | * | 9/1991 | Machek ....................... 222/105 |
| 5,312,018 | A | * | 5/1994 | Evezich ...................... 138/110 |
| 5,421,552 | A | * | 6/1995 | Wang et al. ................. 137/903 |
| 5,634,574 | A | | 6/1997 | McArthur et al. |
| 5,816,450 | A | | 10/1998 | Alexander et al. |
| 6,041,977 | A | | 3/2000 | Lisi |
| 6,047,858 | A | | 4/2000 | Romer |
| 6,076,804 | A | * | 6/2000 | Cabrera ....................... 137/903 |

* cited by examiner

Primary Examiner—Lesley D. Morris
Assistant Examiner—Stephanie Willatt
(74) Attorney, Agent, or Firm—Reising, Ethington, Barnes, Kisselle, Learman & McCulloch PC

(57) ABSTRACT

A gas-assisted food decorating system is provided for applying frosting and the like to an item of food. The system includes a foot pedal assembly having a pedal housing and a movable pedal. A variable pressure valve assembly is disposed in the foot pedal assembly between the pedal housing and the pedal. An input hose extends between a source of pressurized gas and an input opening in the valve. An output hose extends between an output opening of the valve and a dispenser. The dispenser includes a chamber for holding the frosting, and a nozzle in communication with the chamber for dispensing the frosting. The flow of frosting can be controlled by manipulating the foot pedal assembly.

10 Claims, 3 Drawing Sheets

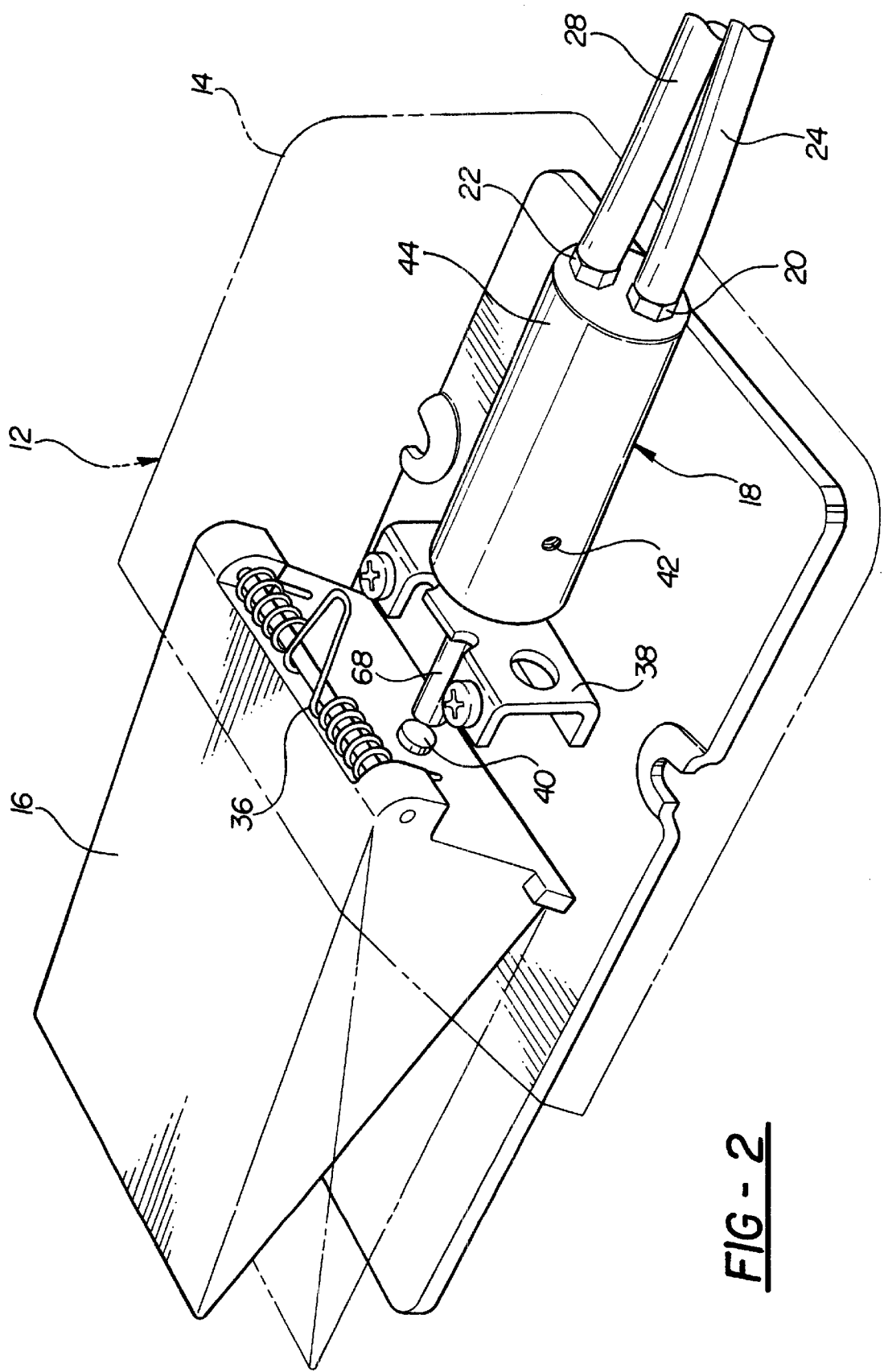

FOOD DECORATING SYSTEM

TECHNICAL FIELD

The subject invention relates to pressurized dispensing systems for dispensing a viscous liquid, and more particularly to systems for dispensing such liquid in a controlled way under variable pressures.

BACKGROUND OF THE INVENTION

Persons skilled in the food dispensing arts have devised a number of systems for dispensing food in a controlled way. This is usefull in the case where the food is a viscous liquid, and it is desirable to dispense the food in a decorative or aesthetically pleasing way. For example, one age-old technique involves a hand-held frosting bag having a nozzle at one end for dispensing the frosting. There are a number of more sophisticated arrangements for dispensing frosting and the like under pressure for the purpose of decorating pastries, cakes, cookies, and other baked goods. U.S. Pat. No. 3,272,393 to Roeser shows a system having a pedal-operated dispenser that includes a variable pressure valve in fluid communication with a dispensing nozzle. Similarly, U.S. Pat. No. 6,041,977 to Lisi shows another pedal-operated system for dispensing frosting and the like. The Roeser system may provide somewhat better control over the fluid; and it does not rely on the undesirable use of water to drive the dispensing. But Roeser is unduly complicated and not sufficiently compact. Moreover, its configuration may lead to problems with fluid weeping out of the dispenser due to residual pressure acting on the dispenser.

The art needs a more efficient and elegant arrangement for dispensing food in a controlled way.

SUMMARY OF THE INVENTION AND ADVANTAGES

The present invention overcomes the problems of the prior art and provides a simple and useful gas-assisted food decorating system for applying a viscous fluid to an item of food. The system includes a foot pedal assembly having a pedal housing and a pedal movably secured to the pedal housing. A variable pressure valve assembly is disposed in the foot pedal assembly between the pedal housing and the pedal, the variable pressure valve assembly having an input opening and an output opening. An input hose is provided and has a first end connected to the input opening of the variable pressure valve and a second end adapted to connect to a source of pressurized gas. There is also an output hose having a first end connected to the output opening of the variable pressure valve and a remote second end. A dispenser is attached to the second end of the output hose, the dispenser including a chamber for holding the viscous fluid, and a nozzle in communication with the chamber for dispensing the fluid.

Foot pedal assemblies tend to be preferred over hand-actuated or trigger assemblies because the dispensers are not as bulky, and therefore permit a greater amount of control. The present invention is simple, compact, easy to use, and effective. The present invention is also configured to minimize the problem of material weeping out of the dispenser.

FIGURES IN THE DRAWINGS

Other advantages of the present invention will be readily appreciated as the same becomes better understood by reference to the following detailed description when considered in connection with the accompanying drawings wherein:

FIG. 2 is a perspective view of the foot pedal with the cover removed to show the arrangement of the variable pressure valve within the foot pedal;

DESCRIPTION OF THE PREFERRED EMBODIMENT

Figure 1:
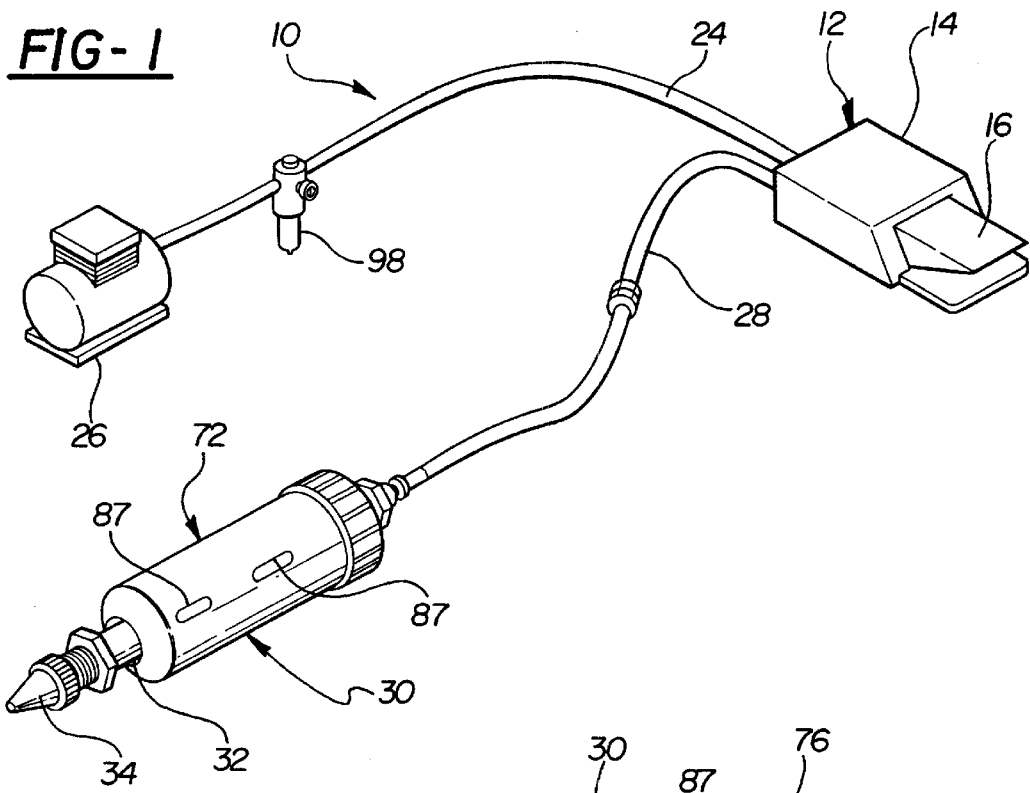
FIG. 1 is a perspective view of the overall food dispensing system.

Referring to the Figures wherein like numerals indicate like or corresponding parts throughout the several views, a food decorating system is generally shown at 10. The system 10 is intended for use in connection with decorating pastries, cakes, cookies, and other baked goods with viscous fluids such as frosting and icing. But the system 10 can be adapted for similar uses with other viscous fluids. For example, the system can be used to apply glue to an article or object that needs to be glued to another article.

According to a basic conception of the invention, the system 10 includes a foot pedal assembly generally indicated at 12 having a pedal housing 14 and a pedal 16 movably secured to the pedal housing. A variable pressure valve assembly generally indicated at 18 is disposed in the foot pedal assembly 12 between the pedal housing 14 and pedal 16, the variable pressure valve assembly 18 having an input opening 20 and an output opening 22. There is an input hose 24 having a first end connected to the input opening 20 of the variable pressure valve 18 and a second end adapted to connect to a source of pressurized gas 26. There is also an output hose 28 having a first end connected to the output opening 22 of the variable pressure valve 18 and a remote second end. Finally, the system includes a dispenser generally indicated at 30 attached to the second end of the output hose 28, where the dispenser 30 includes a chamber 32 for holding the viscous fluid, and a nozzle 34 in communication with the chamber 32 for dispensing the fluid.

The foot pedal assembly 12 is shown most clearly in FIGS. 1 and 2. FIG. 1 shows how it is arranged with respect to the pressure source, e.g. the air compressor 26, and the dispenser 30. FIG. 2 shows the details of the foot pedal system 12. The pedal 16 is hinged to the pedal housing 14 in the manner shown. Spring 36 is disposed between the pedal housing 14 and the pedal 16 to bias the pedal in an "up" rest position. In this position, the pedal 16 does not engage the valve assembly 18, which is attached to the pedal housing 14 by the bracket 38. The pedal 16 includes a button 40 that is located to engage the valve assembly 18 when the pedal 16 is depressed a given amount. There are various ways to adjust the location of the valve assembly 18 in relation to the button 40. For example, one could use washers (not shown) to raise the bracket relative to the button 40; or to space the valve assembly 18 back away from the button 40. One desirable supplier of the foot pedal assembly 12 is Linemaster Switch Corp., of Woodstock, Conn.

Figure 3:
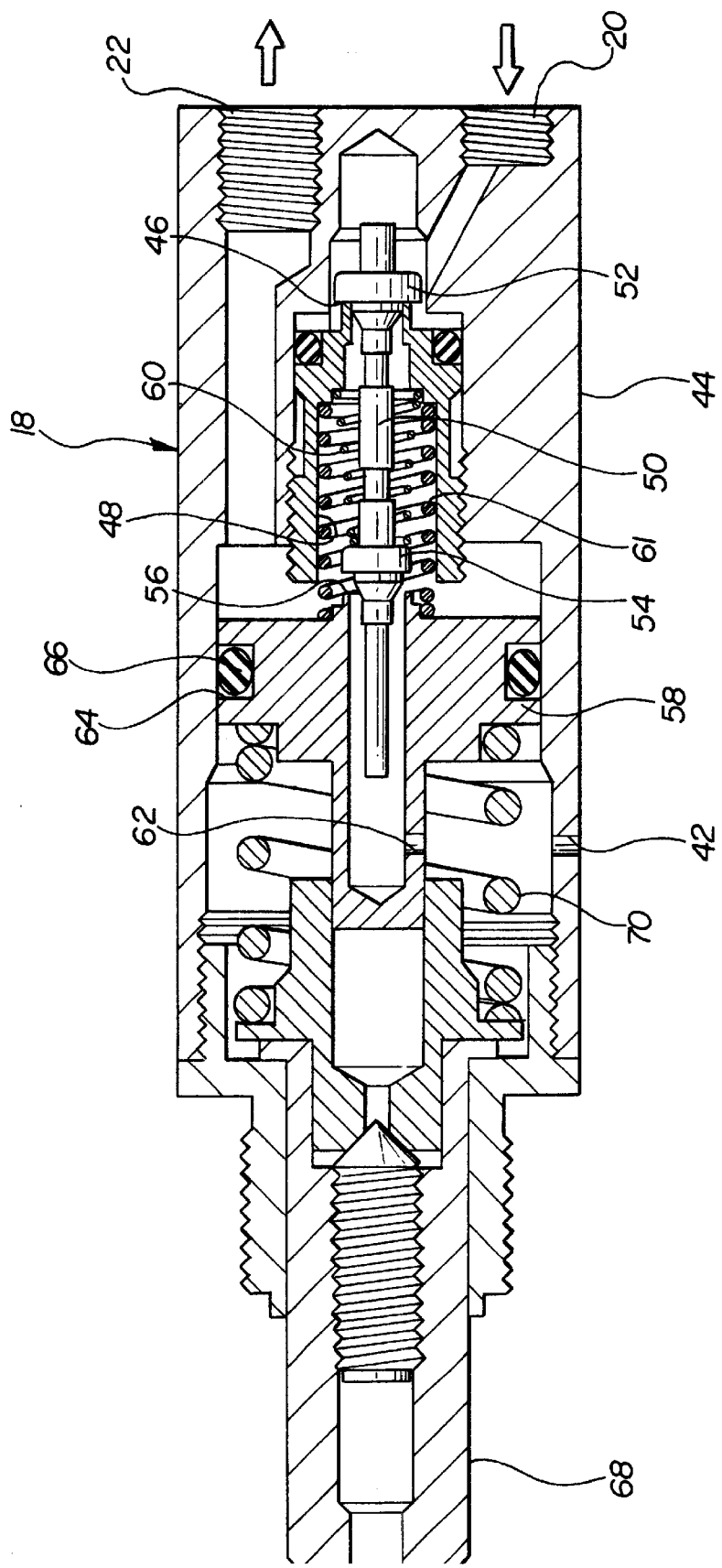
FIG. 3 is a side sectional view of the variable pressure valve showing the arrangement of elements within the valve.
Figure 1:
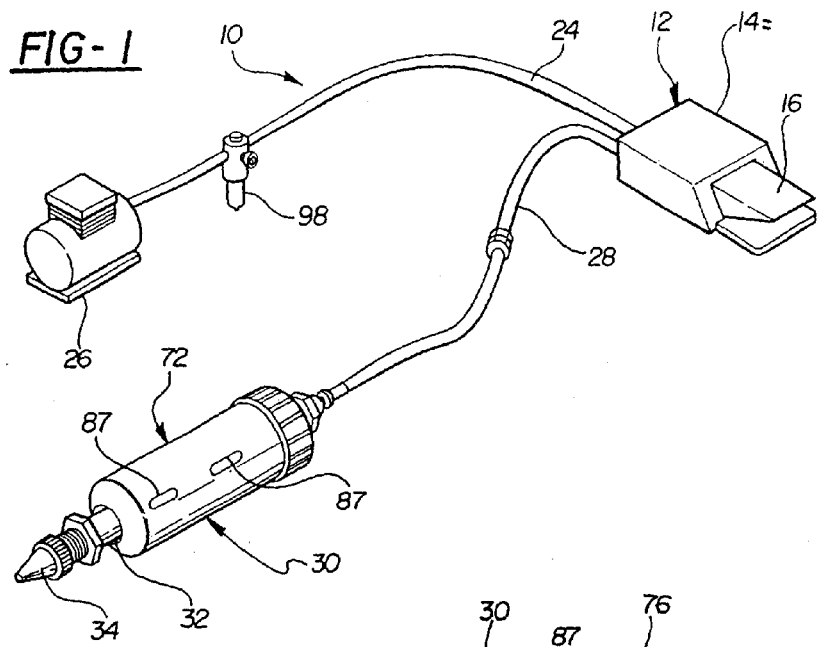
Figure 4:
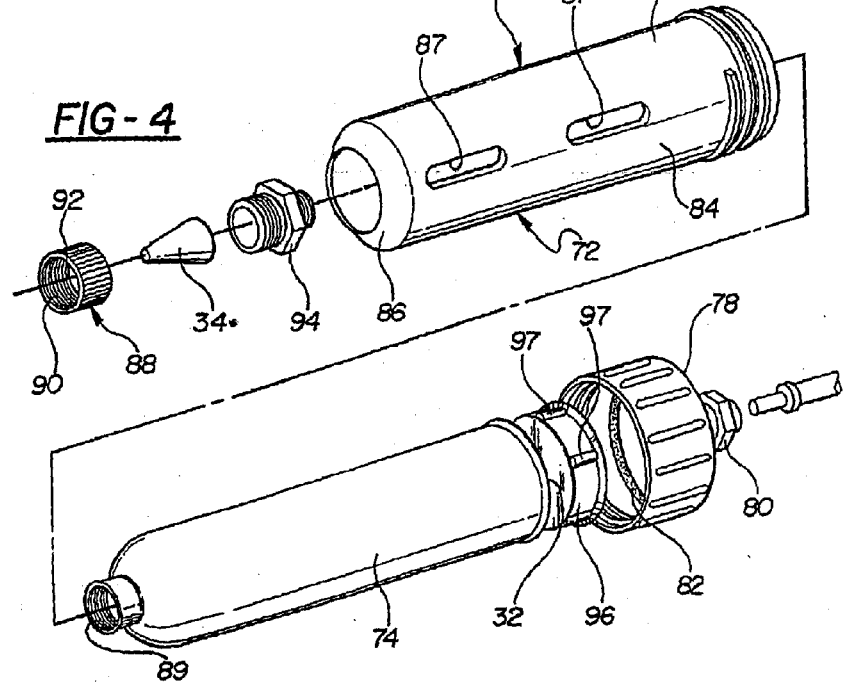

The valve assembly 18 is a variable pressure valve assembly with a relief vent for relieving pressure in the system 10 downstream of the valve assembly 18. The valve assembly 18 is shown in cross-section in FIG. 3. It includes a casing 44 having the input opening 20 and the output opening 22. Pressurized air travels into the casing 44 through the input opening 20 and follows a path through the inlet valve seat 46, through the valve stem chamber 48, past the piston 58, and around to the outlet opening 22. A valve stem 50 operates in the stem chamber 48. It has an inlet valve head 52 that can seat against the inlet valve seat 46, and a relief valve head 54 that can seat on the piston seat 56 of the piston 58. Valve spring 60 is disposed in the stem chamber 48 as shown in FIG. 3 to bias the valve stem 50 into the closed position with the inlet valve is head 52 seating against the inlet valve seat 46. Return spring 61 biases the piston 58 to the left as shown in FIG. 3. This helps keep the passageway open between the piston seat 56 and the relief valve head 54 to promote rapid venting. The piston 58 has a passageway 62 leading to the relief vent 42. The piston 58 also defines an annular groove 64 receiving the sealing ring 66. Control pin 68 extends from the casing 44 as shown. Control pin 68 is interconnected with the piston 58 by means of the piston spring 70. Control pin 68 is supported in the casing 44 for movement between a closed position and a full open position. A currently preferred supplier of this variable pressure valve assembly is Beswick Engineering Co. Inc. of 284 Ocean Rd., Greenland, N.H. 03840.

In operation, one may control the pressure of air acting on the dispenser 30 by manipulating the control pin 68. If one pushes the control pin 68 away from the closed position shown in FIG. 3, this will compress the piston spring 70, which in turn moves the piston 58. The piston seat 56 will butt the relief valve head 54 to push the inlet valve head 52 away from the inlet valve seat 46. This will allow pressurized air to flow into the input opening 20, past the inlet valve seat 46, around, and out the outlet opening 22. Pressure will then build downstream of the valve assembly 18 to act on the dispenser 30. Because the piston seat 56 is butting the relief valve head 54, the pressurized air will not vent through the relief vent hole 42. The operator may vary the pressure acting on the dispenser 30 by controlling the extent to which the control pin 68 is depressed. The operator may stop the flow of air by releasing the control pin 68. The return spring 61 will push the piston 58 back, which in turn pushes the control pin 68 back to its closed position. In the process, the piston seat 56 moves away from the relief valve head 54 to create an opening for air to flow out of the vent hole 42. The valve spring 60 will also draw the inlet valve head 52 against the inlet valve seat 46. At this point the pressurized air will vent through the passageway 62 and out the vent hole 42 and escape to atmosphere. This eliminates or minimizes any weeping of fluid out of the dispenser 30 that would result from residual pressure in the output hose 28.

Figure 4:
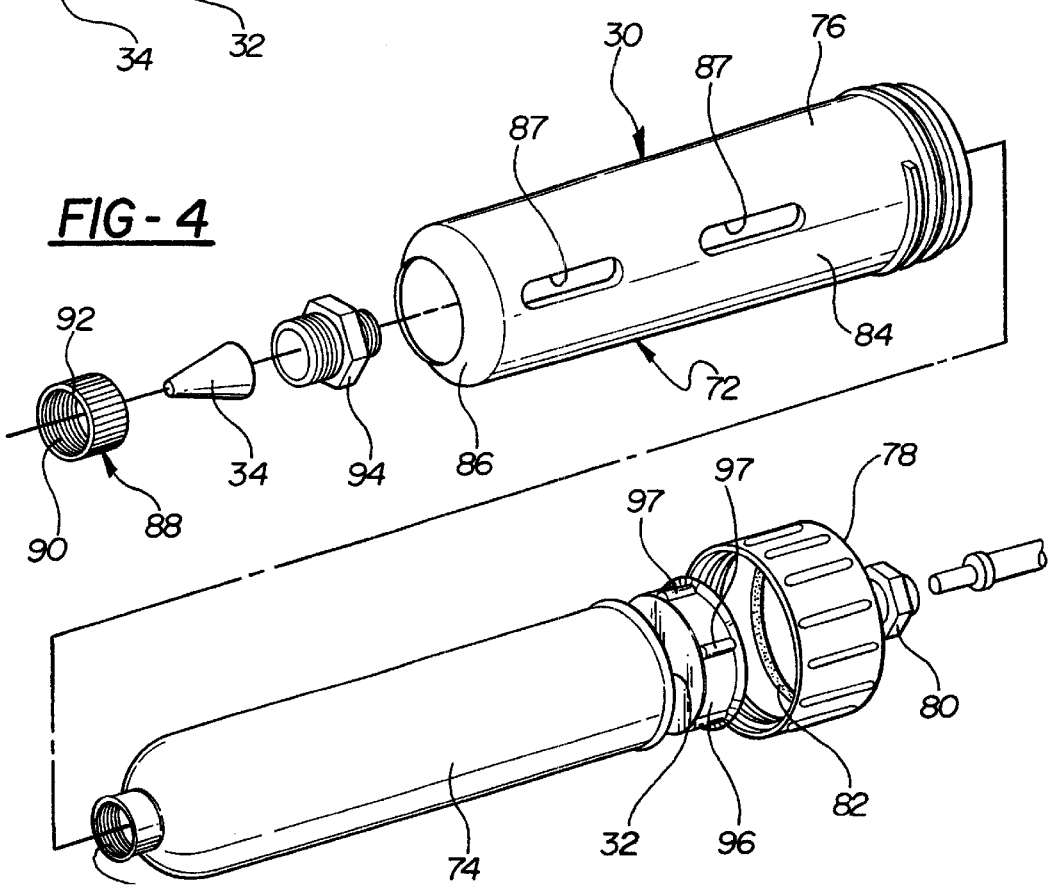
FIG. 4 is an exploded perspective view of the dispenser and its parts.

Details of the dispenser 30 are shown in FIG. 4. The dispenser 30 includes a cartridge holder generally indicated at 72 and a removable cartridge 74. The cartridge holder 72 has a body 76 and a top 78 adapted to thread onto the body. The top 78 includes a common quick-disconnect feature 80 for allowing the output hose 28 to quickly attach to and detach from the top 78. The top 78 also includes a sealing ring 82 for minimizing air leakage. The body 76 defines a space for receiving and retaining the removable cartridge 74. The body 76 includes the cylindrical wall 84 and the inwardly tapering flange 86 that captures the cartridge 74. The body 76 also includes a number of sight holes 87 for allowing the operator to determine how much frosting is in the cartridge 74.

The system 10 is designed for quick changing of cartridges 74 and nozzles 34 to provide maximum artistic freedom with colors, varieties, and shapes of frosting, icing, or other viscous fluids. This design is reflected partially in the cartridge holder 72 and also in the cartridge 74. The cartridge 74 has an elongated tubular body defining the chamber 32, and a dispensing end including cartridge threads 89. The cartridge 74 is preferably made from a transparent material to allow the operator to see the color and amount of frosting contained in the cartridge.

The cartridge 74 mates either directly or indirectly with a nozzle jacket generally indicated at 88 having jacket threads 90. The nozzle jacket 88 further includes a flange 92 engaging the nozzle 34 to retain the nozzle on the cartridge 74. In the preferred embodiment shown in FIG. 4, there is an adapter 94 with first and second sets of threads for mating, respectively, with the cartridge threads 89 and the jacket threads 90.

At the other end of the cartridge 74, one may insert a plunger 96. The plunger 96 may desirably include axially-arranged air-escape ribs 97, as is commonly known, to minimize air pockets between the plunger 96 and the frosting that may cause weeping of the frosting out of the nozzle 34 even when pressure is not applied to the plunger 96. The plunger 96 is preferred, but it is not strictly necessary.

Turning back to FIG. 1, the system 10 includes a filter disposed along the input hose 24 upstream of the variable pressure valve. The system 10 also includes a regulator disposed along the input hose 24 upstream of the variable pressure valve. These items are disposed in a combined unit as shown at 98 in FIG. 1.

The basic operation of the system 10 is fairly simple. The operator first selects a cartridge 74 having a desired frosting or similar product. The cartridge 74 may be pre-filled or the operator may need to fill it just prior to use. If the cartridge 74 is pre-filled, it is desirable to include a threaded plug (not shown) for threading into the threads 89 at the dispensing end to close the dispensing end. The opposite end may also be closed in some desired manner. For example, the plunger 96 may be inserted after the frosting to close off the opposite end. In any case, the cartridge 74 inserts into the cartridge holder 72 in the manner shown in FIG. 4. Some desirable nozzle 34 is then fitted onto the cartridge 74—also in the manner shown in FIG. 4. Then the top 78 is threaded onto the body 76 of the holder 72 and the output hose 28 is attached to the top. At this point, the rest of the system 10 should be configured and assembled as shown in FIG. 1.

Now the operator may start the air compressor 26 and begin dispensing frosting. The operator can control the flow of frosting by controlling the pedal 16 with his or her foot. To the extent the operator depresses the pedal 16, the pedal button 40 will first engage and then push against the control pin 68. The control pin 68 will move from its closed position shown in FIG. 3 toward the fully opened position. Air will flow through the input hose 24 from the compressor 26, through the filter/regulator 98, through the variable pressure valve 18 in the manner described above, through the output hose 28, and into the dispenser 30 where it will push against the frosting to force it out of the nozzle 34. The more the operator depresses the pedal, the more the frosting will flow out of the nozzle 34. Once the operator removes his or her foot from the pedal 16, the spring 36 will force the pedal 16 back up and the variable pressure valve assembly 18 will close. The spring 36 will force the pedal to the end of its travel and away from contact with the valve assembly 18 so the valve assembly 18 is allowed to vent. Return spring 61 will push control pin 68 to its closed position to ensure venting. As described above, the valve assembly 18 will vent pressurized air from the system downstream of the valve assembly 18 to minimize or prevent weeping of frosting out of the nozzle 34 due to any residual pressure.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

I claim:

1. A gas-assisted food decorating system for applying a viscous fluid to an item of food, the system comprising:

a foot pedal assembly including a pedal housing and a pedal movably secured to the pedal housing for movement between a first end of travel and a second end of travel;

a variable pressure valve assembly disposed in the foot pedal assembly between the pedal housing and the pedal, the variable pressure valve assembly having an input opening and an output opening;

an input hose having a first end connected to the input opening of the variable pressure valve assembly and a second end adapted to connect to a source of pressurized gas;

an output hose having a first end connected to the output opening of the variable pressure valve assembly and a remote second end; and a dispenser attached to the second end of the output hose, the dispenser including a chamber for holding the viscous fluid, and a nozzle in communication with the chamber for dispensing the fluid.

2. The food decorating system of claim 1 including a spring disposed between the pedal and the pedal housing biasing the pedal to the first end of travel.

3. The food decorating system of claim 1 wherein the variable pressure valve assembly is fixed to the pedal housing spaced away from the pedal when the pedal is at the first end of travel.

4. The food decorating system of claim 3 including a bracket interconnecting the variable pressure valve assembly and the pedal housing.

5. The food decorating system of claim 1 further including a filter disposed along the input hose upstream of the variable pressure valve assembly.

6. The food decorating system of claim 1 further including a regulator disposed along the input hose upstream of the variable pressure valve assembly.

7. The food decorating system of claim 1 wherein the dispenser includes a cartridge holder and a removable cartridge disposed within the cartridge holder, with the cartridge defining the chamber.

8. The food decorating system of claim 7 further including a nozzle jacket mating with the cartridge, the nozzle jacket further including a flange engaging the nozzle to retain the nozzle on the cartridge.

9. The food decorating system of claim 1 wherein the variable pressure valve assembly includes a control pin supported for movement between an open position and a closed position, the control pin being supported to engage the pedal and control the pressure acting on the dispenser in response to movement of the pedal, the variable pressure valve assembly further including a return spring associated with the control pin biasing the control pin into the closed position.

10. A gas-assisted fluid dispensing system for applying a viscous fluid to an article, the system comprising:

a foot pedal assembly including a pedal housing and a pedal movably secured to the pedal housing for movement between a first end of travel and a second end of travel;

a variable pressure valve assembly disposed in the foot pedal assembly between the pedal housing and the pedal, the variable pressure valve assembly having an input opening and an output opening;

an input hose having a first end connected to the input opening of the variable pressure valve assembly and a second end adapted to connect to a source of pressurized gas;

an output hose having a first end connected to the output opening of the variable pressure valve assembly and a remote second end; and a dispenser attached to the second end of the output hose, the dispenser including a chamber for holding the viscous fluid, and a nozzle in communication with the chamber for dispensing the fluid.

* * * * *

UNITED STATES PATENT AND TRADEMARK OFFICE
CERTIFICATE OF CORRECTION

PATENT NO.    : 6,494,345 B2
DATED         : December 17, 2002
INVENTOR(S)   : Schrader, Robert J.

It is certified that error appears in the above-identified patent and that said Letters Patent is hereby corrected as shown below:

Drawing sheet 1 of 3, should be deleted to be replaced with the drawing sheet as shown on the attached page.

Column 3,
Line 8, after "inlet valve" delete "is."

Signed and Sealed this

Eighth Day of July, 2003

JAMES E. ROGAN
*Director of the United States Patent and Trademark Office*

U.S. Patent    Dec. 17, 2002    Sheet 1 of 3    6,494,345 B1